(12) United States Patent
Palaniappan et al.

(10) Patent No.: US 6,942,822 B2
(45) Date of Patent: Sep. 13, 2005

(54) PROCESS FOR THE PREPARATION OF POLYANILINE SALT

(75) Inventors: Srinivasan Palaniappan, Hyderabad (IN); Chellachamy A. Amarnath, Hyderabad (IN)

(73) Assignee: Council of Scientific & Industrial Research, New Delhi (IN)

( * ) Notice: Subject to any disclaimer, the term of this patent is extended or adjusted under 35 U.S.C. 154(b) by 42 days.

(21) Appl. No.: 10/290,458

(22) Filed: Nov. 8, 2002

(65) Prior Publication Data

US 2004/0089848 A1 May 13, 2004

Related U.S. Application Data

(63) Continuation-in-part of application No. 09/896,935, filed on Jun. 29, 2001, now Pat. No. 6,586,565.

(51) Int. Cl.$^7$ ............................................. H01B 1/12
(52) U.S. Cl. ..................... 252/500; 528/210; 528/422
(58) Field of Search ..................... 252/500; 528/422, 528/210

(56) References Cited

U.S. PATENT DOCUMENTS

| | | | |
|---|---|---|---|
| 5,232,631 A | | 8/1993 | Cao et al. |
| 5,470,505 A | | 11/1995 | Smith et al. |
| 5,618,469 A | | 4/1997 | Harlev et al. |
| 5,728,321 A | | 3/1998 | Abe et al. |
| 6,586,565 B2 | * | 7/2003 | Palaniappan ................ 528/422 |
| 6,630,567 B1 | * | 10/2003 | Palaniappan et al. ....... 528/422 |

OTHER PUBLICATIONS

Cao et al., "Influence of Chemical Polymerization Conditions on the Properties of Polyaniline," Polymer, vol. 30, Dec. 1989, Butterworth & Co. (Publishers) Ltd., pp. 2305–2311.

Palaniappan, "The Effect of Temperature on the Behavoir of Poly (o–Chloroaniline Salts: Conductivity and Spectral Studies," Polymers for Advanced Technologies, vol. 5, No. 5, May 1994, John Wiley & Sons, Ltd., pp. 263–268.

Mav et al, "Sulfonated Polyanilines Prepared by Copolymerization of 3–Aminobenzenesulfonic Acid and Aniline: The Effect of Reaction Conditions on Polymer Properties," Journal of Polymer Science, vol. 38, No. 18, Sep. 15, 2000, John Wiley & Sons, Ltd., pp. 3390–3398.

Norris et al., "Electrochemical Synthesis and Chiroptical Properties of Optically Active Poly(o–Methoxyaniline)," Macromolecules, vol. 33, No. 9, May 2, 2000, American Chemical Society, pp. 3237–3243.

Li et al., "Oxidative Copolymerization of 2–Pyridylamine and Aniline," Journal of Polymer Science, vol. 38, No. 24, Dec. 15, 2000, John Wiley & Sons, Inc., pp. 4407–4418.

Vikki et al., "Molecular Recognition Solvents for Electrically Conductive Polyaniline," Macromolecules, vol. 29, No. 8, 1996, American Chemical Society, pp. 2945–2953.

Kinlen et al., "Emulsion Polymerization Process for Organically Soluble and Electrically Conducting Polyaniline," Macromolecules, vol. 31, No. 6, 1998, American Chemical Society, pp. 1735–1744.

Oliga et al., "Highly Conducting and Solution–Processable Polyaniline Obtained Via Protonation with a new Sulfonic Acid Containing Plasticizing Functional Groups," Macromolecules, vol. 33, No. 6, Mar. 21, 2000, American Chemical Society, pp. 2107–2113.

Osterholm et al., "Emulsion Polymerization of Aniline," Polymer, vol. 35, No. 13, 1994, Butterworth–Heinemann Ltd., pp. 2902–2906.

* cited by examiner

Primary Examiner—Mark Kopec
(74) Attorney, Agent, or Firm—Foley & Lardner LLP

(57) ABSTRACT

The present invention provides a process for preparing polyaniline salt using an organic acid by polymerizing an aromatic amine in presence of a mixture of aqueous and an organic solvent using an anionic surfactant and a radical initiator at a temperature in the range of 5 to 55° C. for a period ranging from 4 to 24 hours and separating it to obtain polyaniline salt in both solution and solid forms, which are soluble in organic solvents and a mixture of solvents.

13 Claims, No Drawings

PROCESS FOR THE PREPARATION OF POLYANILINE SALT

This application is a Continuation-in-Part of U.S. application Ser. No. 09/896,935, filed on Jun. 29, 2001, now U.S. Pat. No. 6,586,565.

FILED OF THE INVENTION

The present invention relates to a process for the preparation of polyaniline salt. The present invention more particularly relates to a process for preparation of polyaniline salt, which is soluble in organic solvents, and mixture of solvents.

BACKGROUND AND PRIOR ART REFERENCES

Polyaniline has emerged as one of the most promising conducting polymers, because of its excellent chemical stability combined with respectable levels of electrical conductivity of the doped or protonated material. Polyaniline is also of special interest because the electrical properties of polyaniline can be reversibly controlled both by oxidation and by protonation. Thus, a wide range of associated electrical, electrochemical, and optical properties, coupled with excellent environmental stability, make polyaniline a useful material in a wide variety of technologically important applications.

Investigation has been conducted in recent years with a view towards applying polyaniline materials in a wide variety of applications such as electrode materials, batteries, antistatic materials e.g., paints, adhesives, films, electromagnetic shielding materials, functional devices-e.g., photoelectric transducers, optical memories and various sensors, display devices, various hybrid materials, transparent electroconductors, LED, electro-optic devices photocells, circuit boards, etc. electron beam photoresistive agents, and various terminal equipment.

Polyaniline can be synthesized from monomer by both electrochemical and chemical oxidative polymerization methods. Electrochemical oxidation utilizes an electrochemical charge transfer reaction, whereas chemical oxidation occurs by means of chemical reaction with an appropriate oxidizing agent.

The chemical oxidative polymerization of aniline is particularly important since this mode of synthesis is the most feasible for large-scale production of polyaniline. The chemical oxidative polymerization of aniline routinely is carried out in acidic aqueous solutions.

Synthesis of polyaniline salt (emeraldine salt) is commonly performed by the method of chemical oxidative polymerization based upon an aqueous solution polymerization system. (see Cao et al., *Polymer*, 30:2305, 1989; Palaniappan, *Polymers for Advanced Technologies*, 5:295, 1994). This method involves combining water, a protonic acid, aniline and an oxidizing agent and allowing the mixture to react while maintaining the reaction mixture at constant temperature. After a period of several hours, the precipitated polyaniline is separated from the reaction mixture by filtration and washed. The polyaniline obtained in such way is normally insoluble, which hinders the application of the polyaniline.

Harlev et al., U.S. Pat. No. 5,618,469, disclosed a method for preparing a processable solution of emeraldine salt for use in the preparation of electrically conductive and optically transparent coatings, and to articles, such as liquid crystal devices and other electro-optic devices. Such method comprises oxidatively polymerizing aniline monomer in the presence of a protonic acid, for example pyruvic acid, to yield a solid emeraldine salt, reacting the solid emeraldine salt with an aqueous ammonia solution to form a solid emeraldine base, and dissolving the emeraldine base in an additional amount of pyruvic acid to form a solution of polyaniline. Abe et al., U.S. Pat. No. 5,728,321, disclosed a solution of polyaniline (dissolved in an aprotic polar solvent, such as 1-methyl-2-pyrrolidone) in doped state can be obtained by a method using a specific protonic acid, such as hydrofluoroboric acid, hydrofluorophosporic acid, perchloric acid, or any other organic acids having acid dissociation constant pKa values of less than 4.8, as dopants in the oxidative polymerization of aniline monomer. Some disadvantages of these methods are that the emeraldine salt formed in the reaction mixture during the oxidative polymerization is insoluble and precipitated out so that a complex process is needed to transform the salt into a solid emeraldine base which is then dissolved in acid to form into a processable solution of polyaniline. The undoping of doped polyaniline in order to permit the polyaniline to be soluble in organic solvent is burdensome and increases the production cost.

Routes towards soluble polyaniline include the preparation of polyaniline derivatives and copolymers. (Mav et. al. *Journal of Polymer Science, Part-A, Polymer Chemistry*, 38: 3390, 2000; Norris et. al. *Macromolecules*, 33: 3237, 2000; Xin-Gui Li et. al. *Journal of Polymer Science, Part-A, Polymer Chemistry*, 38: 4407, 2000). Unfortunately, these species invariably show significantly reduced conductivities in comparison with the (unmodified) homopolymer.

Smith et al., U.S. Pat. No. 5,470,505, disclosed that the emeraldine salt prepared by standard methods of oxidative polymerization of aniline monomer in the presence of a protonic acid can be dissolved in an acid, particularly strong acid such as concentrated $H_2SO_4$, $CH_3SO_3H$, $ClSO_3H$, $CF_3SO_3H$ and $HNO_3$ (70% or fuming). The emeraldine salt (polyaniline) dissolved in one of these acid solutions is then processed into desired articles in the applications.

To improve the processability, emulsion polymerization processes for preparing a polyaniline salt of a protonic acid such as dodecylbenzene sulfonic acid, camphor sulfonic acid have been reported. (Cao et al., U.S. Pat. No. 5,232,631, Example 6B, 1993; Smith et al (*Polymer* 35, 2902, 1994; Terhi Vikki et al., *Macromolecules*, 29, 2945, 1996; Kinlen et al., *Macromolecules*, 31, 1735, 1998; and Olinga et al., *Macromolecules*, 33, 2107, 2000). In these disclosures aniline, a functionalized protonic acid, and an oxidant were combined with a mixture of polar liquid, typically water and a non-polar or weakly polar liquid, e.g. xylene, chloroform, toluene, resorcinol, decahydronaphthalene and 1,2,4-trichlorobenzene, all of which are not completely soluble.

Applicants have earlier filed patent applications for a process for preparation of polyaniline salts in organic solvents is reported. (Pending Indian Patent Application NO.74/DEL/2002 and U.S. patent application Ser. No. 10/098,188 filed on Mar. 13, 2002). The polyaniline salt is in a carrier solvent such as chloroform, dichloromethane, benzene, toluene, xylene and the solution is optically transparent.

Polyaniline salt has been categorized as an inter-actable material, which is neither soluble nor fusible under normal conditions. Several strategies were worked out to introduce solubility and processability in polyaniline. They are Dedoping of polyaniline salt to polyaniline base. Dissolving polyaniline base in aprotic solvent and redoping to polyaniline salt. This procedure is burdensome and increases the production cost.

Preparation of substituted polyaniline; preparation of polyaniline copolymers, which are not, the homopolymer of polyaniline salts. The conductivity of the substituted polyaniline and copolymer may be much lower than that of the polyaniline.

Dissolving the polyaniline salt in concentrated acid. However, they are highly corrosive because the use of concentrated acid.

Preparation of polyaniline salt using functionalized protonic acids by emulsion polymerization process.

In the present invention, a process for preparation of polyaniline salt is reported. The polyaniline salt prepared is in carrier solvents and soluble in solvents and mixture of solvents. Polyaniline salt is also prepared in powder form, which is soluble in solvents and mixture of solvents.

OBJECTS OF THE INVENTION

The main object of the present invention is to provide a process for the preparation of polyaniline salt using an organic acid and an aromatic amine.

Another object of the present invention is to provide a process for the preparation of polyaniline salt, wherein, the polyaniline salt is in carrier solvents and in mixture of solvents.

Yet, another object of the present invention is to provide a process for the preparation of polyaniline salt in the powder form, which is also soluble in organic solvents and mixture of solvents.

SUMMARY OF THE INVENTION

Accordingly, the present invention provides a process for the polymerization of aniline to polyaniline salt, wherein polyaniline salt is both in solution and solid forms, which are soluble in organic solvents and mixture of solvents.

DETAILED DESCRIPTION OF THE INVENTION

Accordingly, the present invention provides an improved process for the preparation of polyaniline salt, the said process comprising steps of:

(a) dissolving an ionic surfactant in distilled water and mixing with solution of radical initiator in an organic solvent to obtain a milky white emulsion at a temperature in the range of 30°–50° C., (b) adding drop-wise an aqueous mixture of an aromatic amine and an organic acid to step (a) emulsion, and stirring the above mixture for a period of 4 to 24 hrs at a temperature in the range of 30°–50° C. to obtain a green emulsion, (c) allowing the green emulsion of step (b) to settle and then separating the upper aqueous phase and the lower green oily phase containing the polyaniline salt, (d) washing the green oily phase of step (c) repeatedly with water, drying it over anhydrous sodium sulphate, and filtering to obtain polyaniline salt in organic solvent, (e) optionally precipitating polyaniline salt by adding the solution of step (d) to acetone or formic acid, and (f) separating the precipitated solid and then drying it at about 100° C. to obtain a solid polyaniline salt.

The present invention is directed to a process for the preparation of an electrically conductive polyaniline salt in non-aqueous organic carrier solvent and/or mixture of solvents.

The present invention is also directed to a process for the preparation of an electrically conductive polyaniline salt in the powder form and this is also soluble in organic solvents and mixture of solvents.

In an embodiment of the present invention, the aromatic amine used is aniline.

Another embodiment of the invention provides a process, wherein in step (b), the organic solvent used is selected from a group consisting of chloroform, dichloromethane, benzol, toulene and xylene.

Still another embodiment, the organic acid used in step (b) is selected from a group consisting of maleic acid, maleic anhydride and oxalic acid.

Still another embodiment of the invention, the polyaniline salt is obtained in carrier organic solvent.

Yet another embodiment, the polyaniline salt in carrier organic solvent has good electrical conductivity.

Yet another embodiment, the polyaniline salt obtained is in powder form having good electrical conductivity.

Yet another embodiment, the polyaniline salt obtained is soluble in an organic solvent or a mixture of organic solvents.

In an another embodiment of the present invention, the organic solvent used is selected from a group consisting of N,N-dimethyl formamide, dimethyl sulfoxide, 1-methyl-2-pyrrolidone, chloroform, dichloromethane, benzene, toluene, xylene, butanol, decanol, dodecanol, cyclohexanol, methylcyclohexane, dioctyl phthalate and/or combination thereof.

In yet another embodiment of the present invention provides a process, wherein the anionic surfactant used in step (a) is selected from a group consisting of ammonium laureth sulfate, ammonium laureth ether sulfate, sodium laureth sulfate, sodium lauryl sulphate, sodium sulfonate, sodium sulfosuccinimate and sodium tridecyl ether sulfate.

In yet another embodiment of the present invention, the anionic surfactant used is sodium lauryl sulfate.

In still yet another embodiment of the present invention, the radical initiator used is selected from a group consisting of benzoyl peroxide, t-butyl hydroperoxide and cumene hydroperoxide.

In a feature of the present invention, the separation of polyaniline salt in organic solvent is affected by pouring the reaction mixture into acid followed by water.

In another feature of the invention, the separation of the polyaniline salt from the reaction mixture may be affected by pouring the reaction mixture into acetone followed by filtration.

The novelties of the present invention are (i) preparation of polyaniline salts using maleic acid or other organic acids; (ii) polyaniline salt is in a carrier solvent and can be transferred to other solvents and mixture of solvents, (iii) polyaniline in the powder form is also soluble in solvents and mixture of solvents.

The following examples are given by way of illustration and therefore should not be construed to limit the scope of the present invention.

EXAMPLE 1

The following example illustrates the preparation of polyaniline salt by the emulsion polymerization pathway with different reaction time.

A solution containing 1.0 g of sodium lauryl sulfate in 20 ml of distilled water was mixed with another solution containing 2.5 g benzoyl peroxide in 30 ml chloroform. The milky-white emulsion thus formed was stirred at 40° C. Aqueous solution containing 1.0 ml of aniline and 2.9 g of maleic acid in 50 ml water was added dropwise to the emulsion over a period of approximately 20 minutes. The reaction was allowed to proceed for a specific period of time (4, 6, 8, 12, 16, 24 hrs). The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally the polyaniline salt was dried at 100° C. till a constant weight.

The polyaniline salts in the dry powder form are compressed into pellets using a 16 mm diameter Macro-Micro die and a 12-ton hydraulic press. The powder is placed in the die and a pressure of 950 Kg/cm² is applied. Each pellet thus formed is measured to determine its diameter and thickness. The pellets are in the shape of disks. In measuring the conductivity a pellet is coated with silver paint on both the sides having the same cross sectional area and the resistance is measured using an ohmmeter. Conductivity is calculated using the following formula:

Conductivity=(Thickness)/(resistance×area)=d/(RA)

| Time (hrs.) | Yield (gm.) | Conductivity (S/cm) |
|---|---|---|
| 4 | 0.85 | 0.02 |
| 6 | 1.20 | 0.12 |
| 8 | 1.18 | 0.08 |
| 12 | 1.19 | 0.09 |
| 16 | 1.20 | 0.10 |
| 24 | 1.19 | 0.10 |

EXAMPLE 2

The following example illustrates the preparation of polyaniline salt by the emulsion polymerization pathway with different amount of benzoyl peroxide.

A solution containing 1.0 g of sodium lauryl sulfate in 20 ml of distilled water was mixed with another solution containing benzoyl peroxide (1.2, 2.5, 3.7 gm.) in 30 ml chloroform. The milky-white emulsion thus formed was stirred at 40° C. Aqueous solution containing 1.0 ml of aniline and 2.9 g of maleic acid in 50 ml water was added dropwise to the emulsion over a period of approximately 20 minutes. The reaction was allowed to proceed for 6 hrs. The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally, the polyaniline salt was dried at 100° C. till a constant weight.

| Amount of benzoyl peroxide (gm.) | Yield (gm.) | Conductivity (S/cm) |
|---|---|---|
| 1.2 | 0.45 | 0.02 |
| 2.5 | 1.20 | 0.12 |
| 3.7 | 1.19 | 0.02 |

EXAMPLE 3

The following example illustrates the preparation of polyaniline salt by the emulsion polymerization pathway with different amount of sodium lauryl sulfate.

A solution containing sodium lauryl sulfate (0.5, 1.0, 1.5) in 20 ml of distilled water was mixed with another solution containing 2.5 g benzoyl peroxide in 30 ml chloroform. The milky-white emulsion thus formed was stirred at 40° C. Aqueous solution containing 1.0 ml of aniline and 2.9 g of maleic acid in 50 ml water was added dropwise to the emulsion over a period of approximately 20 minutes. The reaction was allowed to proceed for 6 hrs. The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally the polyaniline salt was dried at 100° C. till a constant weight.

| Amount of sodium lauryl sulfate (gm.) | Yield (gm.) | Conductivity (S/cm) |
|---|---|---|
| 0.5 | 0.65 | 0.005 |
| 1.0 | 1.20 | 0.12 |
| 1.5 | 1.05 | 0.11 |

EXAMPLE 4

The following example illustrates the preparation of polyaniline salt by the emulsion-polymerization pathway with different amount of maleic acid.

A solution containing 1.0 g of sodium lauryl sulfate in 20 ml of distilled water was mixed with another solution containing 2.5 g benzoyl peroxide in 30 ml chloroform. The milky-white emulsion thus formed was stirred at 40° C. Aqueous solution containing 1.0 ml of aniline and maleic acid (1.16, 2.32, 2.90, 3.48 gm.) in 50 ml water was added dropwise to the emulsion over a period of approximately 20 minutes. The reaction was allowed to proceed for 6 hrs. The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally the polyaniline salt was dried at 100° C. till a constant weight.

| Amount of maleic acid (gm.) | Yield (gm.) | Conductivity (S/cm) |
|---|---|---|
| 1.16 | Nil | Nil |
| 2.32 | 1.18 | 0.05 |
| 2.90 | 1.20 | 0.12 |
| 3.48 | 1.18 | 0.08 |

EXAMPLE 5

The following example illustrates the preparation of polyaniline salt by the emulsion polymerization pathway with different temperature.

A solution containing 1.0 g of sodium lauryl sulfate in 20 ml of distilled water was mixed with another solution containing 2.5 g benzoyl peroxide in 30 ml chloroform. The milky-white emulsion thus formed was stirred at a particular temperature (5° C., 40° C., 50° C.). Aqueous solution containing 1.0 ml of aniline and 2.9 g of maleic acid in 50 ml water was added dropwise to the emulsion over a period of approximately 20 minutes. The reaction was allowed to proceed for 6 hrs. The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally, the polyaniline salt was dried at 100° C. till a constant weight.

| Temperature (° C.) | Yield (gm.) | Conductivity (S/cm) |
|---|---|---|
| 5 | Nil | Nil |
| 10 | Nil | Nil |
| 40 | 1.20 | 0.12 |
| 50 | 0.62 | 0.004 |

EXAMPLE 6

The following example illustrates the preparation of polyaniline salt by the emulsion-polymerization pathway using different solvent.

A solution containing 1.0 g of sodium lauryl sulfate in 20 ml of distilled water was mixed with another solution containing 2.5 g benzoyl peroxide in 30 ml solvent (chloroform, dichloromethane, benzene, toluene, xylene). The milky-white emulsion thus formed was stirred at 40° C. Aqueous solution containing 1.0 ml of aniline and 2.9 g of maleic acid in 50 ml water was added dropwise to the emulsion over a period of approximately 20 minutes. The reaction was allowed to proceed for 6 hrs. The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally the polyaniline salt was dried at 100° C. till a constant weight.

| Solvent | Yield (gm.) | Conductivity (S/cm) |
|---|---|---|
| Chloroform | 1.20 | 0.12 |
| Dichloromethane | 1.19 | 0.10 |
| Benzene | 1.25 | 0.12 |
| Toluene | 1.05 | 0.03 |
| Xylene | 1.23 | 0.07 |

EXAMPLE 7

The following example illustrates the preparation of polyaniline salt by the emulsion polymerization pathway using maleic anhydride and oxalic acid.

A solution containing 1.0 g of sodium lauryl sulfate in 20 ml of distilled water was mixed with another solution containing 2.5 g benzoyl peroxide and maleic anhydride (2.45 gm) or oxalic acid (3.15 gm) in 30 ml chloroform. The milky-white emulsion thus formed was stirred at 40° C. Aqueous solution containing 1.0 ml of aniline in 50 ml of water was added dropwise to the emulsion over a period of approximately 20 minutes. The reaction was allowed to proceed for 6 hrs. The color of the emulsion became green. The bottom oily green phase containing the polyaniline salt and a upper aqueous phase were separated by a separating funnel. The organic phase was repeatedly washed (four times) with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase. The polyaniline salt was precipitated in 300 ml acetone. The precipitated polyaniline salt was filtered, washed with 1500 ml water followed by 300 ml acetone. Finally the polyaniline salt was dried at 100° C. till a constant weight.

| System | Yield (gm.) | Conductivity (S/cm) |
|---|---|---|
| Maleic anhydride | 1.01 | 0.09 |
| Oxalic acid | 0.96 | 0.0007 |

EXAMPLE 8

The following example illustrates the preparation of the polyaniline salts in solvents and in mixture of various solvents.

Polyaniline salt in powder form prepared using example 1 was dissolved in 1-methyl-2-pyrrolidone, dimethyl sulfoxide, dimethyl formamide. Polyaniline salt is soluble in solvents. 6–7 gm of polyaniline salt in the powder form is completely soluble in 100 ml of solvent.

The solubility of polyaniline salt in 1-methyl-2-pyrrolidone solution (2 ml) was checked in various solvents of different known amount. The solvents tested are N,N- dimethyl formamide, dimethyl sulfoxide, chloroform, dichloromethane, benzene, toluene, xylene, butanol, decanol, dodecanol, cyclohexanol, methylcyclohexane, dioctyl phthalate etc. The polyaniline salt is soluble in mixture of solvents

EXAMPLE 9

The following example illustrates the preparation of polyaniline salt by the emulsion polymerization pathway in different solvents and mixture of solvents.

A solution containing 1.0 g of sodium lauryl sulfate in 20 ml of distilled water was mixed with another solution containing 2.5 g benzoyl peroxide in 30 ml chloroform. The milky-white emulsion thus formed was stirred at 40° C. Aqueous solution containing 1.0 ml of aniline and 2.9 g of maleic acid in 50 ml water was added dropwise to the emulsion over a period of approximately 20 minutes. The reaction was allowed to proceed for a specific period of time (4, 6, 8, 12, 16, 24 hrs). The color of the emulsion became green. The bottom oily green phase containing the polyaniline salt and a upper aqueous phase were separated by a separating funnel. The organic phase was repeatedly washed (four times) with 200 ml of water. The organic phase was poured into formic acid and precipitated the polyaniline salt. Dissolved the polyaniline salt in chloroform solution, washed the chloroform solution three times with 200 ml of water. Finally, the green polyaniline phase was treated with sodium sulfate (5 g) and filtered through filter paper. The polyaniline salt thus obtained appeared to be uniform to the naked eye and the polyaniline salt remained solubilized in the organic phase.

A similar procedure was repeated using various solvents such as dichloromethane, benzene, toluene, xylene.

Polyaniline salt in carrier solvents such as dichloromethane, chloroform, benzene, toluene or xylene solution (1 ml) was added in to 9 ml of dichloromethane and this solution was mixed with 10 ml of test solvent. The solvent dichloromethane was evaporated using Rota vapour and polyaniline salt was transferred to test solvent. The solubility of the polyaniline salt in the test solvent was checked.

| Sl. No. | Solvents | Solubility |
|---|---|---|
| 1 | Chloroform | Soluble |
| 2 | 1,2-dichloroethane | Soluble |
| 3 | Benzene | Soluble |
| 4 | Toluene | Soluble |
| 5 | Xylene | Soluble |
| 6 | Chlorobenzene | Soluble |
| 7 | 1,2-dichloro benzene | Soluble |
| 8 | Nitro benzene | Soluble |
| 9 | N,N-Dimethylformamide | Soluble |
| 10 | Dimethyl sulfoxide | Soluble |
| 11 | 1-methyl-2-pyrrolidone | Soluble |
| 12 | Propanol | Soluble |
| 13 | Butanol | Soluble |
| 14 | Decanol | Soluble |
| 15 | Dodecanol | Soluble |
| 16 | Cyclohexanol | Soluble |
| 17 | Methyl cyclohexane | Soluble |
| 18 | Dioctyl phthalate | Soluble |
| 19 | Ethylene glycol | Not soluble |
| 20 | Tetrahydrofuran | Not soluble |
| 21 | 2-butoxy ethanol | Not soluble |
| 22 | Methanol | Not soluble |
| 23 | Ethanol | Not soluble |
| 24 | Isoamyl alcohol | Not soluble |
| 25 | Paraffin oil | Not soluble |

EXAMPLE 10

The following example illustrates the preparation of the polyaniline salts in various solvents.

Polyaniline salt in dichloromethane solution (known amount) was added in to known amount of dichloromethane (total volume 10 ml) and this solution was mixed with 10 ml of 1-methyl-2-pyrrolidone. The solvent dichloromethane was evaporated using Rota vapour and polyaniline salt was transferred to 1-methyl-2-pyrrolidone. The solubility of the polyaniline salt in 1-methyl-2-pyrrolidone was checked. Similar procedure was used, for other test solvents.

| Sl. No. | Solvents | Maximum amount of polyaniline salt solution in 10 ml of solvent |
|---|---|---|
| 1 | Chloroform | 10 ml |
| 2 | Benzene | 8 ml |
| 4 | Toluene | 8 ml |
| 5 | Xylene | 8 ml |
| 6 | Chlorobenzene | 6 ml |
| 7 | 1,2-dichloro benzene | 6 ml |
| 8 | Nitro benzene | 6 ml |
| 9 | N,N-Dimethylformamide | 4 ml |
| 10 | Dimethyl sulfoxide | 6 ml |
| 11 | 1-methyl-2-pyrrolidone | 6 ml |
| 12 | Propanol | 2 ml |
| 13 | Butanol | 2 ml |
| 14 | Decanol | 2 ml |
| 15 | Dodecanol | 2 ml |
| 16 | Cyclohexanol | 2 ml |
| 17 | Methyl cyclohexane | 4 ml |
| 18 | Dioctyl phthalate | 4 ml |

EXAMPLE 11

The following example illustrates the preparation of the polyaniline salts in mixture of various solvents.

Polyaniline salt in dichloromethane solution (known amount) was added in to known amount of dichloromethane (total volume 10 ml) and this solution was mixed with 10 ml of 1-methyl-2-pyrrolidone. The solubility of the polyaniline salt in the mixture of solvents was checked. Similar procedure was used for other test solvents.

EXAMPLE 12

The polyaniline salt samples prepared in solution form and polyaniline salt (prepared using above examples) dissolved in solvents are analyzed by electronic absorption spectral technique using Hitachi U 2000 spectrophoto meter. Polyaniline salt in organic solvents is recorded and three peaks are observed at around 350–385, 510–560(s) and 750–850 nm, which corresponds to polyaniline salt system.

ADVANTAGES OF THE PRESENT INVENTION

The main advantages of the present invention are: (i) the preparation of polyaniline salt using maleic acid, wherein, polyaniline salt is electrically conductive, the polyaniline salt is in carrier organic solvent, which can also be transferred to other solvents and mixture of solvents, (2) the polyaniline salt in the powder form is also soluble in solvents and mixture of solvents.

In view of the above, it will be seen that several advantages of the invention are achieved and other advantageous results attained. As various changes could be made in the above methods and compositions without departing from the scope of the invention, it is intended that all matter contained in the above description shall be interpreted as illustrative and not in a limiting sense.

What is claimed is:

1. An improved process for the preparation of polyaniline salt by polymerization, the said process comprising steps of:
   (a) dissolving an anionic surfactant in distilled water and mixing with solution of radical initiator in an organic solvent to obtain a milky white emulsion at a temperature in the range of 30°–50° C.,
   (b) adding drop-wise an aqueous mixture of an aromatic amine and an organic acid to step (a) emulsion, and stirring the above mixture for a period of 4 to 24 hrs at a temperature in the range of 30°–50° C. to obtain a green emulsion,
   (c) allowing the green emulsion of step (b) to settle and then separating the upper aqueous phase and the lower green oily phase containing the polyaniline salt,
   (d) washing the green oily phase of step (c) repeatedly with water, diying it over anhydrous sodium sulphate and then filtering it to obtain polyaniline salt in organic solvent,
   (e) optionally precipitating polyaniline salt by adding the solution of step (d) to acetone or formic acid, and
   (f) separating the precipitated solid, drying it at about 100° C. to obtain a solid polyaniline salt.

2. A process of claim 1, wherein in step (a), the anionic surfactant used is selected from a group consisting of ammonium laureth sulfate, ammonium laureth ether sulfate, sodium laureth sulfate, sodium lauryl sulphate, sodium sulfonate, sodium sulfosuccinimate and sodium tridecyl ether sulfate.

3. A process of claim 1, wherein in step (a) the anionic surfactant used is sodium lauryl sulphate.

4. A process of claim 1, wherein in step (a), the radical initiator used is selected from a group consisting of benzoyl peroxide, t-butyl hydroperoxide and cumens hydroperoxide.

5. A process of claim 1, wherein the radical initiator used is preferably benzoyl peroxide.

6. A process of claim 1, wherein in step (b), the organic solvent used is selected from a group consisting of chloroform, dichlorornethane, benzol, toulene and xylene.

7. A process of claim 1, wherein in step (b), the aromatic amine used is aniline.

8. A process of claim 1, wherein in step (b), the organic acid used is selected from a group consisting of maleic acid, maleic anhydride and oxalic acid.

9. A process of claim 1, wherein in step (d), the polyaniline salt is obtained in carrier organic solvent.

10. A process of claim 1, wherein in step (d), the polyaniline salt in carrier organic solvent is electrically conductive.

11. A process of claim 1, wherein in step (f), the polyaniline salt obtained in powder form is electrically conductive.

12. A process of claim 1, wherein in step (f), the polyaniline salt obtained is soluble in an organic solvent or a mixture of organic solvents.

13. A process of claim 1, wherein the organic solvent used are selected from a group consisting of 1-methyl-2-pynolidene, N,N-dimethyl formamide, dimethyl suiphoxide, chloroform, dichloromethane, benzine, toluene, xylene, butanol, decanol, dodecanol, cyclohexanol, methylcyclohexane, dioctyl phthalate or combinations thereof.

* * * * *